Jan. 12, 1965 J. F. JAMES 3,165,585

SYNCHRONISING APPARATUS FOR TELEVISION CAMERAS

Filed April 16, 1962

INVENTOR
John Frederick James
BY Baldwin & Wight
ATTORNEYS 3,165,585

SYNCHRONISING APPARATUS FOR TELEVISION CAMERAS

John Frederick James, Little Baddow, Essex, England, assignor to The Marconi Company Limited, a British company Filed Apr. 16, 1962, Ser. No. 187,478
Claims priority, application Great Britain, Apr. 20, 1961, 14,296/61
5 Claims. (Cl. 178—69.5)

This invention relates to synchronising apparatus for television cameras and has for its object to solve a serious problem which arises when it is required to operate a television camera at a considerable distance from control equipment therefor.

There are a number of practical cases in which it is necessary, for one reason or another, to operate a television camera at a considerable distance from control equipment therefor and it is by no means unusual to have to provide lengths of cable—usually co-axial cable—of 500 to 1000 ft. long between the control point where the control equipment is located and the camera. Indeed, there are occasions when greater lengths of cable up to about 5000 ft. may be required to be employed between control point and camera. To permit satisfactory mixing and fading in and out of picture signals obtained from different cameras or other signal sources in a group of cameras and other sources, it is necessary for the line blanking intervals in the picture signals from the different sources to be accurately in phase at the point of mixing or fading control. It is also very desirable, for convenience, that the line driving pulses fed to individual cameras in a group shall also be in phase.

Where, as may easily happen in practice, different cameras in a group are at greatly different distances from a control point, the different lengths of cable to the different cameras introduce serious difficulties in the way of satisfying the foregoing requirements. To take a typical practical figure, the time delay introduced by 1000 ft. of co-axial cable such as would ordinarily be employed for connection to a distant camera is about 1.5 μsecs. Thus, if two cameras are fed with the same line driving pulses, one through a cable of negligible length and the other through a cable about 1000 ft. long, there will be a difference in timing of about 3 μsecs. between corresponding points in the line scans because of the difference of cable lengths. In present day usual practice this difference is accommodated by operating the cameras with a line fly-back time which is so short that this time plus the total cable delay (go and return), which has to be allowed for, is adequately less than the system line blanking, when due allowance is made for the timing relationship between line drive and system blanking peculiar to the system concerned. This expedient, however, is not wholly satisfactory because it involves shortening the fly-back time. Moreover, and more importantly, the application of this expedient is fairly severely limited, as will now be shown.

Figure 1:
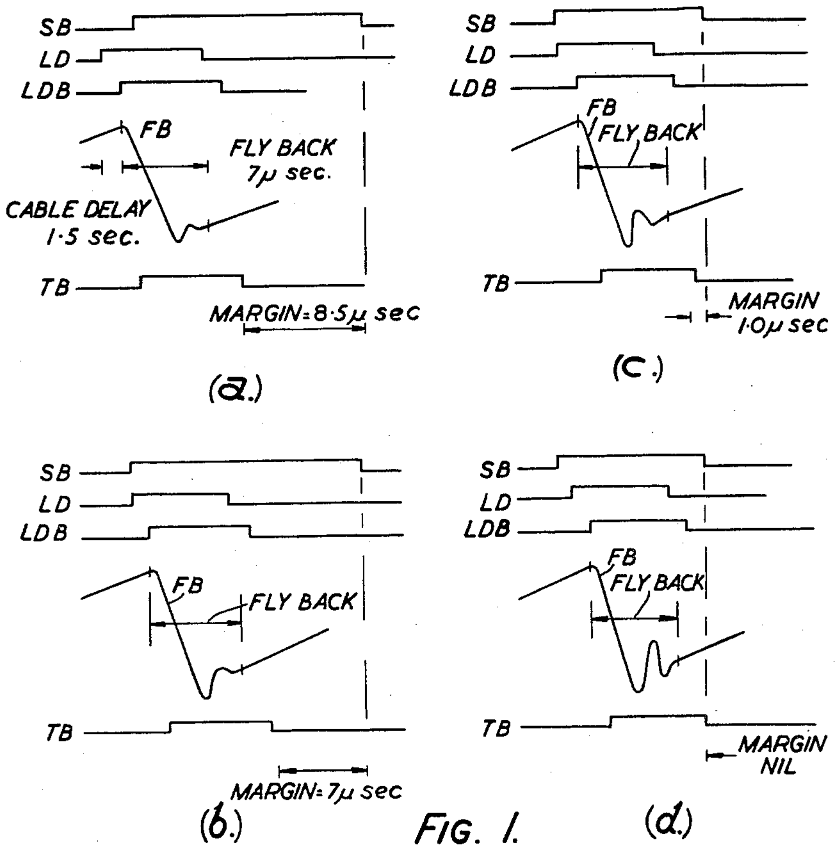
Figure 2:
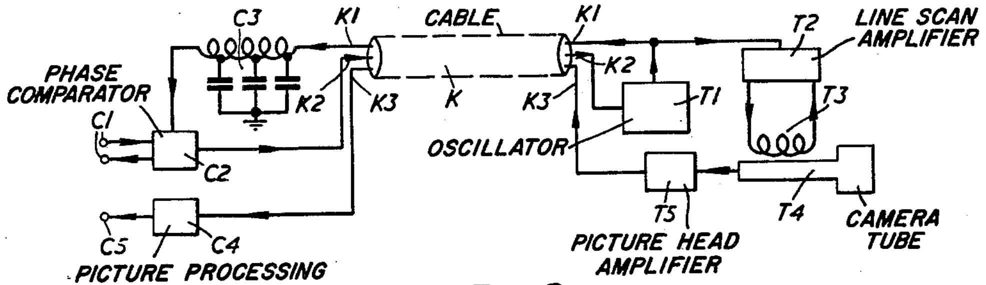

The invention is illustrated in and further described with reference to the accompanying drawings in which FIGURE 1 is a graphical representation provided for purposes of explanation and showing at (*a*), (*b*), (*c*) and (*d*), and in the same conventional manner, the operating characteristics in the vicinity of the line-blanking period of four well known television systems, all double interlaced; and FIGURE 2 is a schematic and simplified diagram of one embodiment of the present invention.

Referring to FIGURE 1, (*a*) and (*b*) represent commonly used variants of a 405 line system, (*c*) represents a 525 line system as at present commonly used in the U.S.A., and (*d*) represents a 625 line system as commonly used in Europe, though there are 625 line systems with characteristics closely similar to those shown in (*c*). In all four representations the top curve SB represents the system line blanking; the next curve LD represents the line drive at the point where the control equipment is situated; the third curve LDB represents the line drive and target blanking at the camera after transmission through a cable having a time delay due to its length (assumed to be about 1000 ft.) of 1.5 μsecs.; the fourth curve FB shows the flyback between one line and the next; and the bottom curve TB represents (after its subsequent arrival at the control point) that portion of the camera video signal which has been blanked by target blanking in the camera. It is, of course, important that this period be wholly contained within the duration of system line blanking, otherwise loss of useful picture will occur. Taking the commonly accepted maximum of 1000 ft. for the camera cable, a flyback time of the order of 7 μsecs.—a convenient value for the usual designs of line scanning circuits employing thermionic values—can be comfortably allowed in the systems represented at (*a*), (*b*) and (*c*) in FIGURE 2 and is just allowable in the system represented at (*d*). If, however, it is desired to increase the cable length, adopting the hereinbefore described expedient of reducing the flyback time, limits are fairly soon reached in all these systems, especially in those with the larger numbers of lines. Thus, to increase the cable length to 2000 ft. involves reducing the flyback time in systems (*c*) and (*d*) to approximately 4 μsecs. and to increase to 3000 ft. it involves a reduction to 1 μsec. Increase beyond 3000 ft. is not possible. These are theoretical figures. In practice, tolerances in the various timings have to be allowed and practically speaking about 1000 ft. of cable is the limit for systems as in (*c*); about 900 ft. is the limit for systems as in (*d*); about 4000 ft. is the limit for systems as in (*a*); and about 3000 ft. is the limit for systems as in (*b*). These limits apply because it is the practice to send the line drive into the camera cable with a constant timing between about 2.5 μsecs. in advance of the line blanking and about 1 μsec. in rear of it, depending on the standards in use.

Although it would be possible to increase the permissible lengths of cable by advancing the line drive in relation to blanking—by roughly 3 μsecs. for each extra 1000 ft. of cable—this would have the defect of imposing a minimum length of cable and is therefore not suitable for the practical case of several cameras in a group fed through cable lengths differing by large amounts. Also it is undesirable to send line driving or similar pulses into the camera cable substantially in advance of the commencement of system blanking because any cross-talk, even if only small, between the circuits carrying these signals and those carrying returned video-signals would result in interference in the form of a vertical bar at the right hand edge of a reproduced picture. The limits above discussed are illustrated in FIGURE 1 by showing "margins" available in the four systems chosen for illustration. In system (*a*) in which the line drive (LD) is in advance of the system blanking by 4 μsecs. there is a "margin" (showing at the bottom of (*a*)) of 8.5 μsecs. to accommodate cable delay. In system (*b*) in which the line drive and system blanking are coincident, the margin left is 7 μsecs. In system (*c*) in which, as in system (*d*), the line drive and system blanking are coincident, the margin is only 1.0 μsec. and in system (*d*) there is no margin at all.

When the linescanning circuits are not of the thermionic valve type but employ semi-conductor devices the difficulties and limitations described in the immediately preceding paragraph are increased because it is difficult to obtain even so short a fly-back time as 7 μsecs. when employing normal currently available semi-conductor devices.

The present invention seeks to avoid or overcome the foregoing limitations and difficulties in a very simple manner.

According to this invention a television camera installation wherein a television camera is situated remotely from a control point from which it is to be controlled over a signal path of extended length comprises, at the camera end of said path, a variable frequency oscillator adapted to be controlled in frequency by a control voltage fed thereto, said oscillator being employed to control line scanning in said camera; a phase comparator at the control point end of said path and adapted to produce a control signal dependent on and representative of the phase relation between two signals fed thereto; means for feeding to said phase comparator two inputs, one derived from a line drive source provided at said control point and the other derived from said oscillator; and means for supplying as control voltage to said oscillator output from said phase comparator dependent on the phase relation of the two inputs fed thereto.

According to a feature of this invention a television camera installation comprises a television camera remote from and connected to a control point via a cable of extended length; a variable frequency oscillator adjacent the camera and arranged to control line scanning therein, said oscillator being controllable in frequency by a D.C. control signal; a phase comparator at the control point and fed with input signals derived from said oscillator and with line drive input signals derived from the normally provided line drive system at the control point, said phase comparator being adapted to produce a D.C. voltage dependent on and representative of the phase relation between the two input signals fed thereto; and means for applying said D.C. voltage as frequency controlling voltage to said oscillator.

If required a delay line of predetermined time delay may be inserted in the signal path over which signals from the oscillator are fed as one input to the phase comparator. The provision of a delay line in this manner facilitates the obtaining of precise timing.

The invention has the advantage that, because of the nature of the frequency control signal sent from the control point to the oscillator, the two may be separated, if required, by a long cable and the oscillator will be automatically phased (because of its frequency control by the control signal) in such manner that its signals, as received at the control point end of the cable, will be in phase with the system line drive provided there. Accordingly the oscillator output, as applied to procure line scanning in the camera will be automatically advanced so as to compensate for time delay in the cable. There will therefore be a constant relation between picture timing and timing at the control point irrespective of cable length and it is possible so to arrange the various timings, using passive delays (if necessary) at appropriate points, so that virtually the whole of the blanking interval is available for camera line flyback. Hence it follows that a conventional circuit of 7 $\mu$secs. flyback (or thereabouts) can be used on any at present current television broadcasting standard (including 819 lines) with any practicable length of camera cable. Moreover, because no signals other than a slowly varying D.C. control voltage are fed on the camera cable in the direction opposite to that traversed by the picture signals, there is no danger of interference with the picture signals as a result of cross-talk at the control point end of the cable.

Referring to FIGURE 2 the equipment therein represented includes parts, given references containing the letter C, situated at the control point and parts, given references containing the letter T, at a remote point where the camera is situated, the two points being connected by suitable cabling K of extended length. System line drive pulses applied at terminals C1 are fed as one input to a phase comparator C2 whose other input is obtained over cable conductor K1 from an oscillator T1 near the camera. If required a delay unit or line C3 may be inserted in the conductor K1 for timing purposes. The comparator C2 is adapted to provide a D.C. output representative of the phase relation between the two inputs thereto. The oscillator T1 is of known kind adapted to be controlled by a D.C. control voltage which is fed thereto from comparator C2 over the conductor K2, the control being, of course, in such sense that any phase difference between the two inputs to comparator C2 is self-cancelling by reason of the automatic frequency control exercised on the oscillator T1. Output from the oscillator T1 is also fed to a line scan amplifier T2 feeding the line deflection system, represented by the coil T3, of the camera tube T4, the picture signal output from which, after amplification by a picture head amplifier T5, is fed over conductor K3 to the usual picture processing amplifier C4 feeding via a utilisation output terminal C5 to utilisation equipment (not shown). The oscillator may be a simple oscillator operating at line frequency or it may comprise an oscillation generator operating at an integral multiple of the line frequency followed by a frequency divider of ratio $1/n$ interposed after said generator so that the input from the divider is fed to K1 and T2. Such an arrangement provides an improved control characteristic and also lends itself to operation of the equipment at will on different or alternative standards.

The control voltage fed over conductor K2 to the oscillator T1 is the integral of line-by-line control signals each of which is a measure of the instantaneous phase relation between the two pulse inputs fed to the comparator C2. The time constant of the control circuit is chosen in accordance with the required duty. Where it is desired to make the output frequency independent of short term aberrations in the controlling signal, the time constant is made long; if rapid control is required, it is made short. Phase comparators suitable for use at C2 and capable of giving such a control voltage are well known per se and need no further description herein.

I claim:

1. A television camera installation wherein a television camera is situated remotely from a control point from which it is to be controlled over a signal path of extended length, said installation comprising at the camera end of said path a variable frequency oscillator adapted to be controlled in frequency by a control voltage fed thereto, said oscillator being employed to control line scanning in said camera; a phase comparator at the control point end of said path and adapted to produce a control signal dependent on and representative of the phase relation between two signals fed thereto; means for feeding to said phase comparator two inputs, one derived from a line drive source provided at said control point and the other derived from said oscillator; and means for supplying, as control voltage to said oscillator, output from said phase comparator dependent on the phase relation of the two inputs fed thereto.

2. A television camera installation comprising a television camera remote from and connected to a control point via a cable of extended length; a variable frequency oscillator adjacent the camera and controlling line scanning therein, said oscillator being controllable in frequency by a D.C. control signal; a phase comparator at the control point; means for feeding to said comparator input signals derived from said oscillator; and means for feeding to said comparator, as a second input therefor, line drive input signals derived from the normally provided line drive system at the control point, said phase comparator being adapted to produce a D.C. voltage dependent on and representative of the phase relation between the two input signals fed thereto; and means for applying said D.C. voltage as frequency controlling voltage to said oscillator.

3. An installation as claimed in claim 2 and comprising a delay line of predetermined time delay inserted in the signal path over which signals from the oscillator are fed as one input to the phase comparator.

4. An installation as claimed in claim 2 wherein the oscillator is a line frequency oscillator.

5. An installation as claimed in claim 2 wherein the oscillator comprises an oscillation generator operating at a multiple *n* of the line frequency and, following said generator, a frequency divider of ratio 1/*n*.

References Cited by the Examiner

UNITED STATES PATENTS 2,704,307 3/55 Gillette et al. ---------- 178—69.5

DAVID G. REDINBAUGH, *Primary Examiner.*